United States Patent [19]

Albertini et al.

[11] 3,725,947

[45] Apr. 3, 1973

[54] AUTOMATIC TIMEKEEPING AND ACCOUNTING UNIT

[75] Inventors: Eugene J. Albertini, Tarzana; Stephen K. Shu, Los Angeles, both of Calif.

[73] Assignee: Computer Management Systems, Inc., Los Angeles, Calif.

[22] Filed: Sept. 30, 1971

[21] Appl. No.: 185,055

[52] U.S. Cl. ....................346/33 R, 179/2 R, 346/51, 346/74 M

[51] Int. Cl. ....................G07c 1/10

[58] Field of Search .346/33 R, 51, 74 M; 340/172.5; 179/2 R, 2 DD, 2 CA, 7.1 R, 7.1 TP

[56] References Cited

UNITED STATES PATENTS

| | | | |
|---|---|---|---|
| 2,668,875 | 2/1954 | Shepherd | 179/7.1 R |
| 2,944,867 | 7/1960 | Gregory | 346/59 |
| 3,268,909 | 8/1966 | Green | 346/111 |
| 3,303,471 | 2/1967 | Duncan et al. | 340/172.5 |
| 3,657,488 | 4/1972 | Pountney et al. | 179/100.1 R |

*Primary Examiner*—Joseph W. Hartary
*Attorney*—Jessup & Beecher

[57] ABSTRACT

An automatic timekeeping and accounting unit is provided which has particular utility for use by professional persons such as lawyers, accountants and the like. The unit of the invention is intended to be placed on, in, or behind the desk of the user. The unit, in one of its embodiments, contains a columnar printer, a numeric keyboard entry, a functional dial, a columnar device mechanism, operation buttons, and appropriate electronic circuitry. The unit functions automatically to record a client's identifying number, a work activity code number, and the time spent at the particular work, as well as other appropriate data. A record is then made on a paper tape, or on a magnetic tape cassette, which is used to make up statements, or other appropriate reports. This latter function may be carried out by the subscriber himself, or by a central data processing office.

8 Claims, 6 Drawing Figures

PATENTED APR 3 1973

3,725,947

INVENTORS:-
Eugene J. Albertini
Stephen K. Shu
Jessup and Beecher
By Keith D. Beecher
ATTORNEYS INVENTORS:
Eugene J. Albertini
Stephen K. Siu
By Kemp and Beecher
Keith D. Beecher
ATTORNEYS INVENTORS:
Eugene J. Albertini
Stephen K. Shu
Jessup and Beecher
By Keith D. Beecher
ATTORNEYS INVENTORS:
Eugene J. Albertini
Stephen K. Shu
Jessup and Beecher
By Keith D. Beecher
ATTORNEYS

AUTOMATIC TIMEKEEPING AND ACCOUNTING UNIT

BACKGROUND OF THE INVENTION

The principal purpose of the unit of the present invention is to relieve the practicing professional lawyer, accountant, architect, or the like, of the arduous task of maintaining time records for billing purposes of the various clients which he services, and of subsequently assimilating and processing the time records and transferring the information thereon to separate statements to be sent to the clients.

In the use of the unit of the present invention, the user, upon the start of any work activity, merely presses appropriate push-button switches and makes appropriate dial settings so that data identifying the client and the work activity performed on his behalf may be recorded. The user then pushes a "start" button which starts the time recorder. Upon the completion of the work, he pushes a "charge" button which stops the time recorder and causes the time spent on that activity to be recorded. These operations enable the unit to provide a record of the client's service, as well as of the particular work activity involved, the time spent on that work activity, and other appropriate information, as will be described.

The unit of the invention, in one embodiment to be described herein, is constructed so that a telephone call will automatically stop the recording time on the work activity interrupted by the call, this control being effectuated when the user of the unit actually picks up his telephone to answer a call. The interrupted work will then be charged out, and the telephone call code and time will be recorded. All that the user need do, if a charge is to be made, is to enter a code number identifying the client to whom the telephone conference is to be charged. The identifying data of the interrupted work activity is stored in a memory in the unit during the telephone call and, upon the completion of the call, the unit is constructed so that the interrupted work activity automatically may again be recorded.

In one embodiment of the invention, a paper tape is used in a columnar manner to make the necessary recording, the tape being available to the user, so that he can enter with a pencil or pen, any additional information which he wishes to make directly on the tape. In a second embodiment, a magnetic tape cassette is used. In the latter embodiment, a paper tape mechanism is also provided in conjunction with the removable magnetic tape cassette, the paper tape mechanism serving as a monitor. All the information recorded on the magnetic tape in the cassette, and which is subsequently sent to the central data processing station, is also printed on the paper tape which is retained by the user. In this way, the user has a continuous monitor of what is being recorded on the cassette, and he also has an actual record in his own file of his activities.

DETAILED DESCRIPTION OF THE ILLUSTRATED EMBODIMENTS

Figure 1:
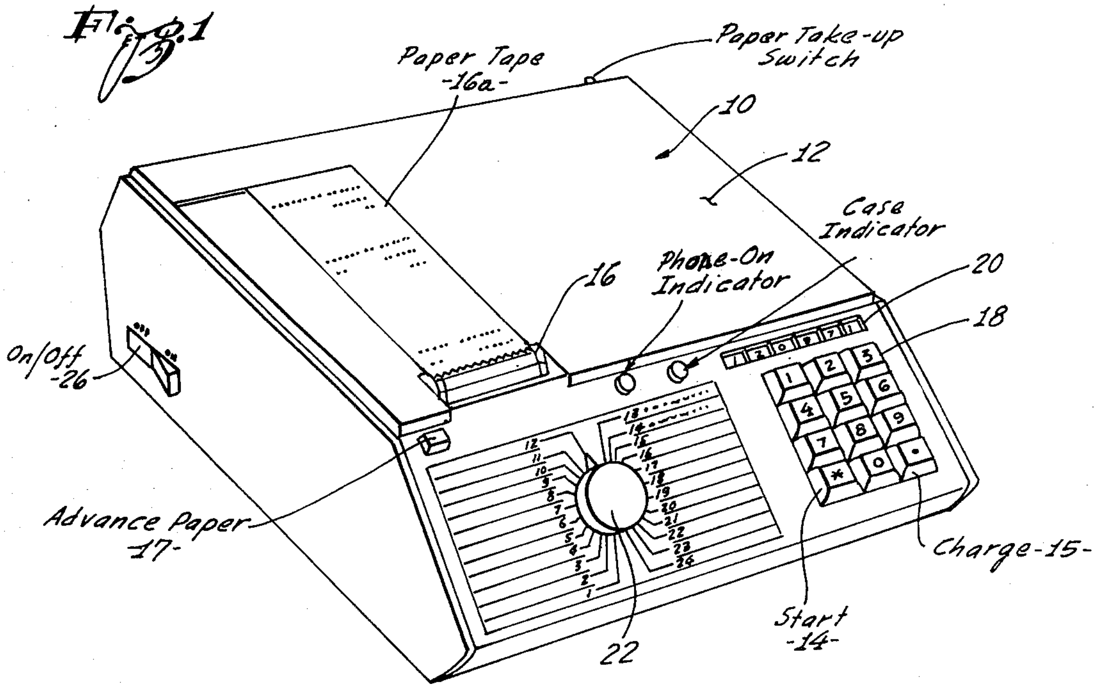
FIG. 1 is a perspective view of an automatic timekeeping and accounting unit which is constructed in accordance with one embodiment of the invention.
Figure 2:
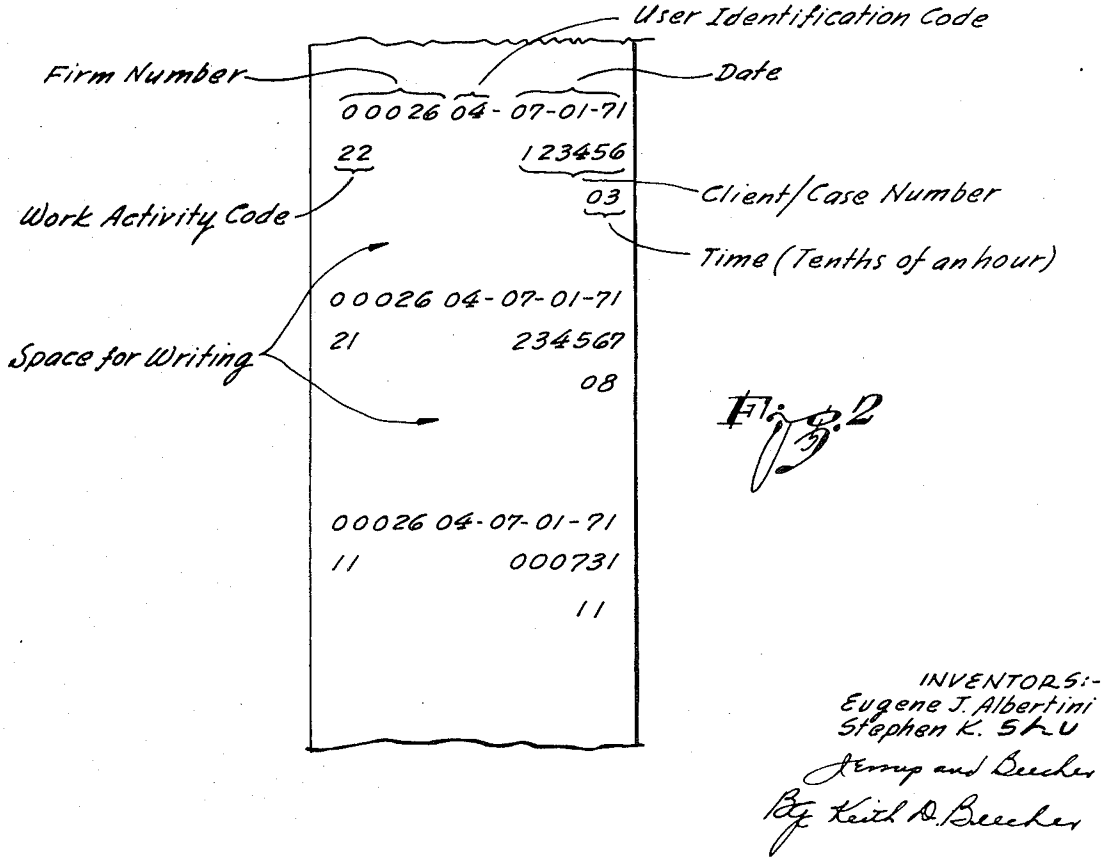
FIG. 2 is a fragment of a paper tape which is used in the unit of FIG. 1, and showing the manner in which data may be recorded on the tape.

The timekeeping unit shown in FIG. 1 is designated generally as 10, and it is equipped with a cover 12 which may be opened to reveal the internal mechanism of the unit. The unit 10 of FIG. 1 includes a paper tape printing mechanism 16, which incorporates a paper tape 16*a*. The paper tape 16*a* is reeled on an appropriate tape transport directly over the top of the cover 12, as shown in FIG. 1. As the unit is being operated, the printer tape mechanism operates to draw the tape 16*a* across the top of the cover 12, and to print appropriate data in columnar form on the tape, as shown in FIG. 2. As mentioned above, the tape is exposed so that additional information may be written directly on the tape by the user, if he so desires.

The unit 10 also includes a numeric keyboard 18 which is operated so that code numbers identifying the various clients may be fed into the system. The number fed into the system at any particular time is revealed on the paper tape 16a observable at the top of the unit 10, as shown in FIG. 1. The unit also includes a function dial 22 which may be turned to any one of a plurality of designated positions, so as to identify the particular work activity being performed for any particular client. In addition, the unit includes a "start" switch 14, a "charge" switch 15, an "advance paper" switch 17, as well as an "on-off" switch 26, and a set of "date" wheels 20.

As shown in FIG. 2, the information printed on the paper tape 16*a* is columnar in nature and includes, for example, a six digit client/case number, of which the first four digits identify the client, the fifth digit identifies the client's case number, and the sixth digit is a check digit. Also recorded is a work activity code number of two digits, and an elapsed time number of two digits, the elapsed time being recorded in tenths of an hour. The foregoing data represents the operational transaction, and each operational transaction is preceded with a five digit number representing the firm using the equipment, a two digit number representing the individual user, and a six digit number representing the date.

In the constructed embodiment, the push-button entry keyboard 18 is constructed for the push-button entry of digits zero through nine, and it also contains the "start" push-button switch 14 and the "charge" push-button switch 15. The function dial 22 contains provisions for the dial entry of 24 distinct work activities in the form of two digits. The "on-off" switch 26 turns the power on or off; the "start" button 14, when activated, starts the timing mechanism in the unit, and causes the transaction identifying data to be printed on the paper tape 16*a*. The "charge" button 15, when activated, causes the elapsed time to be printed, stops the time mechanism, and advances the columnar paper printer mechanism 16. The "advance" paper button 17, when activated, provides a control whereby the paper 16*a* may be advanced at any time. The buttons 14 and 15 may be of the illuminated type, each of which includes an internal lamp which is energized when the corresponding push button is activated.

To activate the unit 10 of FIG. 1 for normal operation, the user first operates the "on-off" switch 26 to turn on the unit, and he then operates the function dial 22 to set up the particular work activity on which he is to be engaged. He then pushes the "start" button 14, and he then enters the proper six digit client/case number through the keyboard 18. The machine then records all the necessary data, as shown in FIG. 2, with the exception of the time record. At the end of the particular activity, the user presses the "charge" push-button 15, and the time spent on the particular work activity for the particular client is then recorded. The unit is then ready for the next work effort to be identified and timed.

For a telephone interruption, and only when the user actually accepts the call, the system automatically stops and the present work activity is charged out, and its identifying data is stored in memory in the machine. Then, the unit operates to identify the telephone interruption by a particular identification code, and to record the time spent on the telephone conference. If the user wishes to record the telephone conference for billing purpose, he merely sets the client's identifying number through the keyboard 18. The user then presses the "charge" button 15, so that a record may be made of the time spent with the particular client on the telephone. Then, the unit automatically prints the previous work activity data and begins keeping time again.

Any errors may be corrected directly on the tape by the user by pen or pencil, and, as shown in FIG. 2, a space may be provided between each separate work activity, to permit the user to enter further notes and information on the tape, if he so desires.

Figure 3:
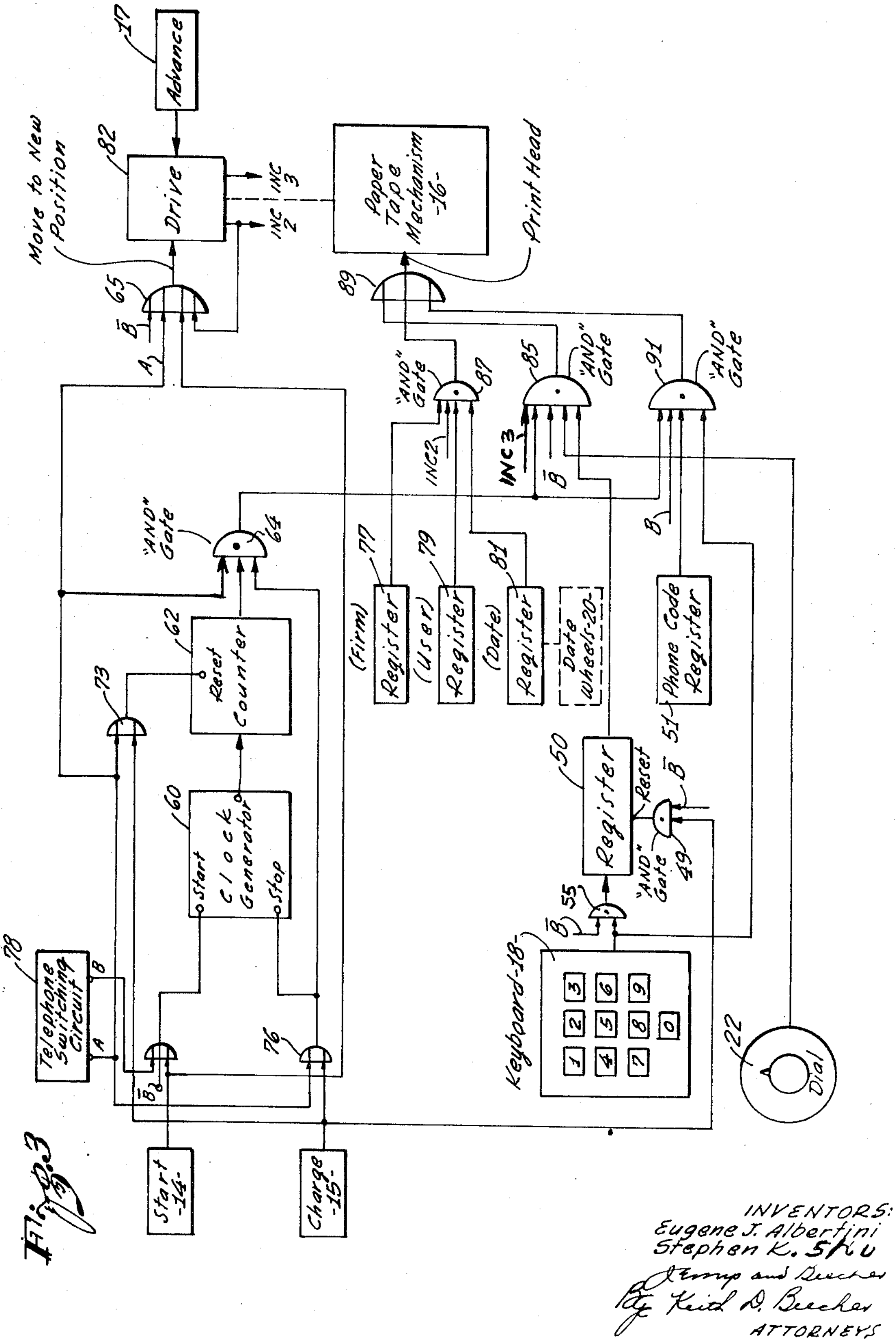
FIG. 3 is a block logic diagram illustrative of appropriate electronic circuitry and components which may be incorporated into the unit of FIG. 1.

As shown in the block logic diagram of FIG. 3, the keyboard 18 associated with the unit 10 of FIG. 1 feeds its information through an AND gate 55 into a register 50, so that any number set up on the keyboard to identify a particular client appears in the register 50. The coding used in the register 50 may be a binary code, or other appropriate code techniques may be used. The output of the register is fed to an AND gate 85, and through a subsequent OR gate 89 to the print head of the paper tape mechanism 16.

The various logic components shown in FIG. 3, including registers, AND gates, OR gates, and the like, are well known to the art, and need not be described in detail. Moreover, any appropriate tape mechanism 16 and associated drive may be used, so that these components likewise need not be shown or described in detail, insofar as a clear understanding of the concept of the present invention is concerned.

The electronic system of FIG. 3 also includes an appropriate clock generator 60 which generates clock pulses, when activated. The "start" push button 14 is connected through an OR gate 74 to the start input of the clock generator 60, so that whenever the start switch 14 is actuated, the clock generator 60 begins to generate clock pulses. The "charge" push-button switch 15 is connected through an OR gate 76 to the "-stop" input of the clock generator 60, so that whenever the "charge" button 15 is actuated, the clock generator 60 is de-activated. When activated, the clock generator 60 generates a series of regularly spaced clock pulses, and these clock pulses are applied to a pulse counter 62. The pulse counter 62 proceeds from one count to the next as long as the clock generator 60 is activated to generate the clock pulses. The clock pulses from the clock generator 60 are applied to an AND gate 64 which, in turn, is connected to AND gates 85 and 91. The "charge" push button 15 is also connected to the AND gate 64. The "start" push button 14 is connected through an OR gate 65 to a drive 82 for the paper tape mechanism 16. Whenever the "start" button 14 is actuated, the drive 82 is caused to move the paper tape mechanism 16 from one position to the next, so that the paper tape mechanism is ready for a new set of data. The "advance" push button 17 is also connected to the drive mechanism 82, so that whenever that push button is actuated, the drive 82 causes the paper tape mechanism to move to the next position.

The activity dial 22 is connected to the AND gate 85. A register 77, in which the firm identifying number is set by any appropriate means; a register 79, in which the user identifying number is set by any appropriate means; and a register 81, in which the date identifying number is set by adjustment of the data wheels 20; are all connected to an AND gate 87. When the drive mechanism 82 is driven to a new position by actuating the "start" pushbutton switch 14, it generates a signal INC2 which enables the AND gate 87 so that the information in the three registers 77, 79 and 81 may be printed. The INC2 signal is also applied to the drive 82 through the OR gate 65, so that the paper tapes 16*a* may then be automatically moved by the mechanism 16 to its next position. The drive 82 then generates a signal INC3 which enables the AND gate 85, and which permits (during normal operation of the system) the keyboard register 50 information and the dial 22 information to be printed. When the "charge" switch 15 is actuated, the AND gate 64 is enabled, so that the time information may then also be printed through the AND gate 85 and through the OR gate 89.

A telephone switching circuit 78 is provided which has an output terminal A connected to the OR gate 76, and which also has an output terminal B connected to the OR gate 74. The telephone switching circuit 78 is energized whenever the user activates his telephone to accept or make a telephone call. When that occurs, a signal is first generated at the output terminal A (output A). The signal from the terminal A first enables the AND gate 64 so that the previously accumulated time on the counter 62 may be passed through the AND gate 85 to be printed on the paper tape 16a by the paper tape mechanism 16. The signal at the output terminal A is also applied through the OR gate 65 to the drive 82, so that the paper tape may be moved to the next position. The signal from the terminal A next passes through the OR gate 76 to stop the clock generator 60, and it passes through the OR gate 73 to reset the counter 62.

The signal at the output terminal A is then replaced by a signal at the output terminal B of the telephone switching circuit 78 (output B), and the signal from the output terminal B passes through the OR gate 74 to start the clock generator 60 which, in turn, causes the counter 62 to be activated to make a count of the time elapsed during the phone conference. During normal operation of the system, no signal appears at the output B of the telephone switching circuit 78, so that the $\overline{B}$ situation is created. During that situation the AND gate 85 is enabled for normal operation of the system, and the AND gate 91 is disabled.

Therefore, in the presence of the $\overline{B}$ mode, and during normal operation of the system, the information from the keyboard 18 may be read through the AND gate 55 into the register 50, and from there through the enabled AND gate 85 and through the OR gate 89 to the paper tape mechanism. Also, the information set by the dial 22 is passed through the enabled AND gate 85 during normal operation to be printed and recorded. At the end of a particular activity, and while the system is in its normal mode, the "charge" button 15 is depressed to cause the charge information to be recorded, as mentioned above, and this causes the register 50 to be reset, by the signal passed through the enabled AND gate 49.

However, during the presence of a telephone conference, and during the continuance of the output B from the switching circuit 78, the AND gate 85 is disabled, and the AND gate 91 is enabled. During this B mode, the telephone code number from the register 51 is passed through the AND gate 91 and through the OR gate 89 to be printed by the paper tape mechanism. Also, the keyboard 18 may now be set to identify the calling or called party on the telephone, and its information will be applied directly through the enabled AND gate 91 and through the OR gate 89 to the printer of the paper tape mechanism 16. Since the AND gate 55 is now disabled, the new number set on the keyboard 18 will not disturb the previous number entered into the register 50.

At the termination of the telephone conference, and when the charge button 15 is actuated to record the elapsed time of the telephone conference, the AND gate 64 is again enabled, so that the reading on the counter 62 may be passed through the AND gate 91 to the paper tape mechanism. When the phone is hung up at the end of the telephone conference, the resulting change of the outB from B to $\overline{B}$, as applied through the OR gate 65 causes the drive 82 to move the paper tape mechanism to its next position, and the interrupted data from the register 50 is again recorded, as the AND gate 85 is again enabled.

The registers 77 and 79 may take the form of internally wired program printed circuit boards which are designed to establish code numbers identifying the firm and the user, as mentioned above. The register 81, as mentioned above, is set from day to day by the date wheels 20, so as to identify the date of the transaction.

To reiterate, therefore, the user, upon the start of any work, sets the work activity dial 22 to the function he is about to perform. He then enters the proper case number on the numeric keyboard 18, and presses the "-start" button 14. The unit now automatically begins to record the time spent on that particular work activity. Upon the completion of the work, the user presses the "charge" push button 15. All his time expended is now recorded on the columnar printer ticket 16*a*, as shown in FIG. 2. In addition to allowing the user to check the correctness of his input information, the printed ticket is later used as a time keeping input data form.

An important feature of the unit described above is the automatic telephone timekeeping data collection. Any time the user activates the phone, either for an incoming call or an outgoing call, the unit will automatically stop recording the time on the particular case and work activity he has interrupted to take or make the phone call. The unit will now record the time expired from the moment he activated the phone to the moment he returned it to the cradle. If he decides the call is non-billable, and he is going to return the interrupted work activity, he simply hangs up, and the unit will automatically start recording time again for the previous work activity. The time expended on the phone call will be recorded as non-billable time.

On the other hand, if he decides the call is to be billed, he enters the proper case number on the keyboard 18 which applies the data through the AND gate 91 to the print head, and the phone call data will be printed on the ticket, and the printer will also print the time expended on the phone call. Again, at the end of the phone call, he merely hangs up, and the unit will automatically start recording the time on the previously interrupted work activity.

As mentioned above, the paper tape is periodically removed from the machine, and either processed in the user's own office, or sent to a central data processing office, for billing and other record purposes.

Figure 4:
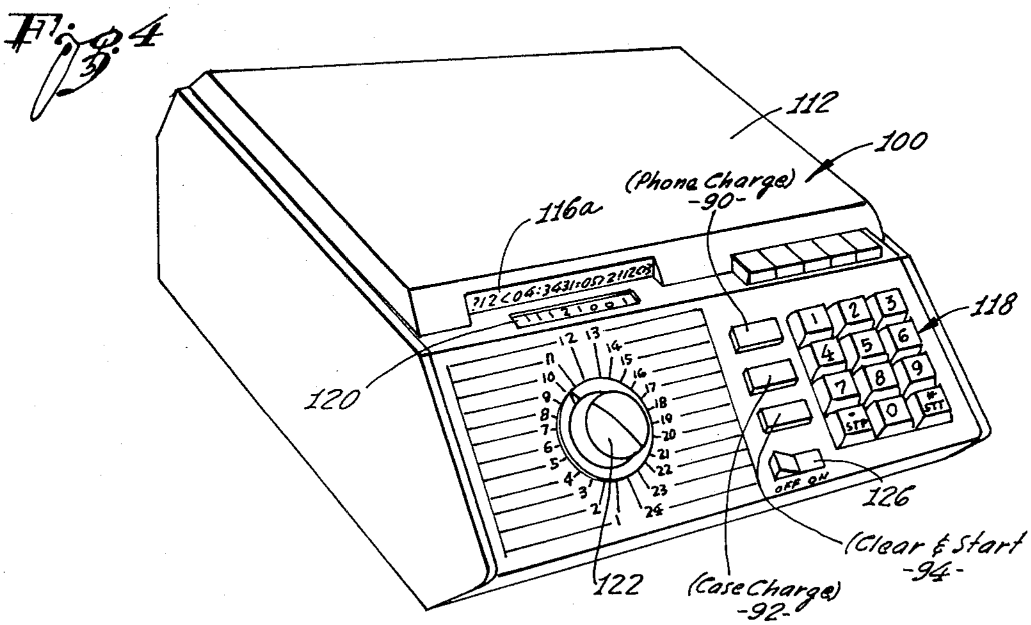
FIG. 4 is a perspective view of a unit constructed in accordance with a second embodiment of the invention.
Figure 5:
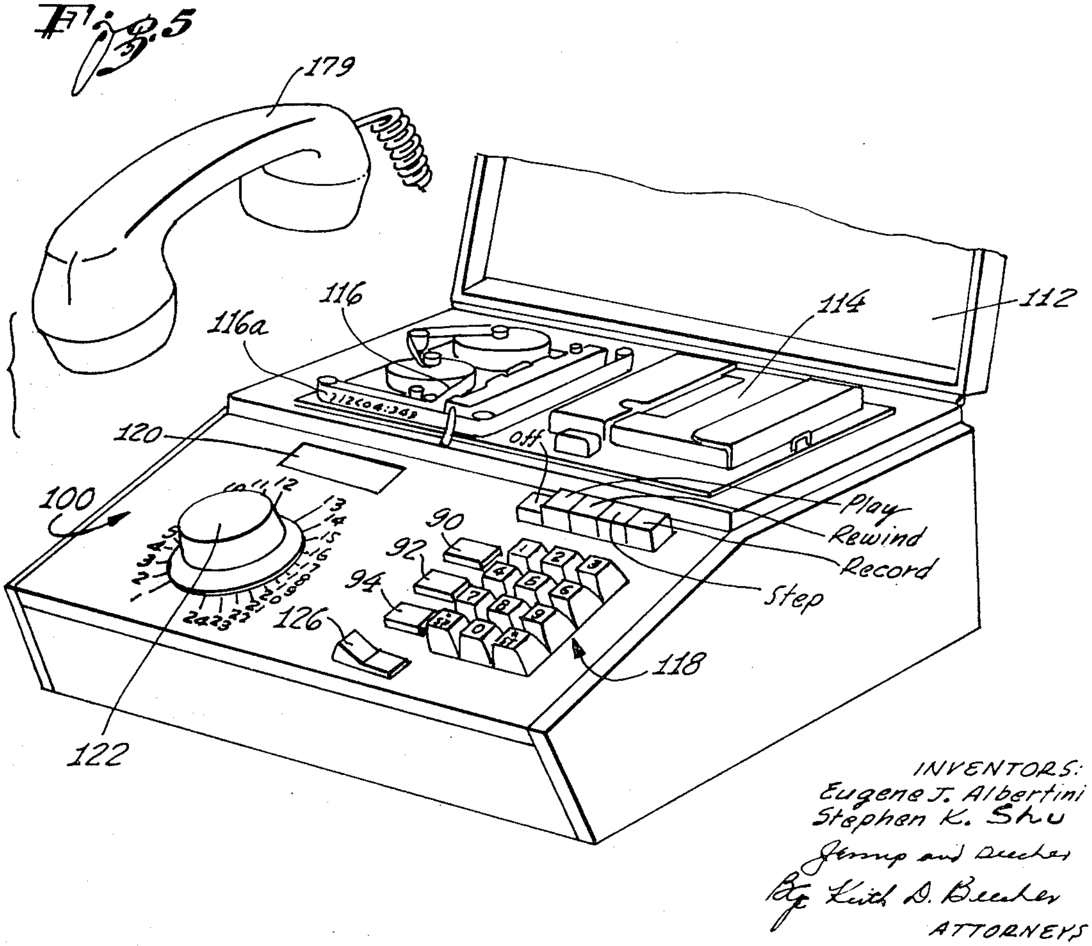
FIG. 5 is a similar perspective view of the unit of FIG. 4, but with the cover of the unit in an open condition to reveal the paper tape mechanism and cassette recording mechanism which are incorporated into the unit.
Figure 6:
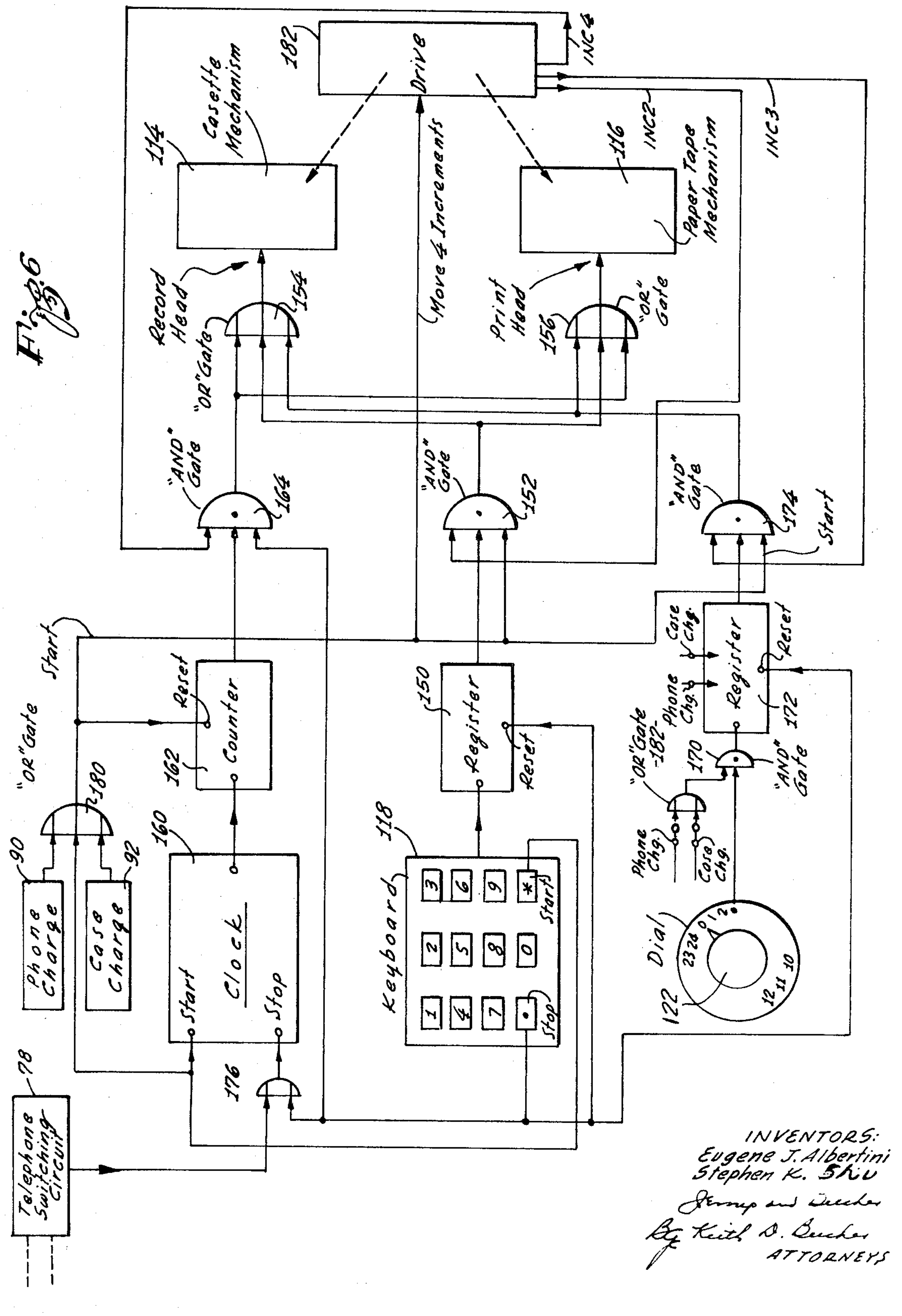
FIG. 6 is a block logic diagram of appropriate electronic circuitry which may be incorporated into the unit of FIGS. 4 and 5.

The embodiment of the invention shown in FIGS. 4, 5 and 6 are generally similar to the embodiment described above, except that the information is recorded on a removable magnetic tape cassette, and the cassette is periodically used, in the place of the paper tape of the previous unit, for making statements, and for other record purposes. The unit in FIGS. 4 and 5 is designated generally as 100.

The unit 100 of FIGS. 4 and 5 has a cover 112 which is shown open in the view of FIG. 5, to reveal a usual cassette drive and recording system 114, as well as a usual paper tape print-out system 116. The paper tape print-out system 116 includes a paper tape 116*a* on which the information is imprinted, the tape 116*a* being observable through the front edge of the cover 112, as shown in FIG. 4.

The unit 100 also includes a keyboard 118 in which numbers identifying the various clients may be fed into the system, the number fed into the system at any particular time being revealed on an indicating register 120. The unit also includes a selector knob 122 which may be turned to any one of the illustrated designated positions, so as to identify the particular work being performed for the particular client.

To activate the unit, the user pushes an "on-off" switch 126 from the "off" to the "on" position, and he then sets up the client's number on the keyboard 118, and turns the knob 122 to the particular work being carried out. He then presses the "start" button on the keyboard, and the machine then records all the necessary data pertaining to the work being performed and the client being serviced. When the work is completed, the user pushes the "stop" button, and the time spent at the work activity is then recorded. The unit is then ready for the next work effort to be identified and timed.

A plurality of control buttons designated respectively "off," "play," "rewind," "record" and "step" are associated with the magnetic tape mechanism 114, and these permit the user to control the recording on the cassette at will. A flat charge may be made to the client on a phone call, or case basis, merely by identifying the client on the keyboard 118, and by then depressing the "phone charge" push button 90 or the "case charge" push button 92.

In the system of FIG. 6, the keyboard 118 feeds into an appropriate register 150, so that any number set up on the keyboard to identify a particular client's account appears in the register 150. The coding used in the register 150 may be a binary code, or other appropriate code techniques may be used. The output of the register is fed through an AND gate 152, and through OR gates 154 and 156 to the cassette recording mechanism 114 and to the paper tape printing mechanism 116. The particular construction of the elements, such as the elements 150, 152, 154 and 156, as well as the mechanisms associated with the cassette 114 and paper tape 116, are well known. These mechanisms function so that when the AND gate 152 is enabled, the numbers set up on the keyboard 118, and which is held in the register 150, is recorded in any appropriate manner on the magnetic tape in the cassette 114, and is imprinted, preferably in decimal characters, on the paper tape **116*a* and the paper tape mechanism 116, so as to be observed through the front of the cover 112 as shown in FIG. 4**.

The system of FIG. 6 also includes clock generating circuit 160 of known composition, and which, when activated, generates a series of regular spaced clock pulses. These clock pulses are applied to a counter 162, and the counter proceeds from one count to the next as long as the clock circuit 160 is activated. The output from the counter 162 is applied to an AND gate 164, and through the OR gates 154 and 156 to the cassette mechanism 114 and paper tape mechanism 116. When the AND gate 164 is enabled, the number stored in the counter 162 is recorded on the magnetic tape in the cassette mechanism 114, and is imprinted on the paper tape **116*a* in the paper tape mechanism 116**.

The dial 122 is connected through an AND gate 170 to a register 172, the circuitry operating in the same manner as the keyboard 118 and register 150, so that the number corresponding to any particular setting of the dial 122 is stored in the register 172. The output of the register is introduced to an AND gate 174, and through the OR gates 154 and 156 to the cassette mechanism 114 and paper tape mechanism 116. When the AND gate 174 is activated, the number corresponding to the reading of the dial 122 is recorded on the magnetic tape in the cassette mechanism 114, and is printed on the paper tape **116*a* in the paper tape mechanism 116**.

The "start" button on the keyboard 118 is connected to the start input terminal of the clock generator 160, so that when the start input button is depressed, the clock generator 160 is activated. The "stop" button on the keyboard 118 is connected through an OR gate 176 to the stop input of the clock generator, so that when the "stop" button is depressed, the clock generator 160 is turned off. A telephone switching circuit 178 is also connected through the OR gate 176 to the stop input terminal of the clock generator 160. The telephone switching circuit 178 is activated whenever the telephone 179 in FIG. 5 is taken off the hook. In this way, any telephone call which is answered by the user interrupts the time recording of the particular task to which the unit of FIGS. 1 and 2 was previously set.

If the user wishes to make a record of the phone call, he may then push the "stop" button on the keyboard 118, and set the keyboard 118 to the number identifying the calling client. He can then push a "phone charge" button 90 (FIGS. 3 and 4) which, together with the "start" button on the keyboard 118 are connected to an OR gate 180, the output of which is connected to reset the counter 162, and to enable the gates 152 and 174. The output of the OR gate 180 is also applied to a drive mechanism 182 for the cassette mechanism 114 and paper tape mechanism 116. The drive mechanism 182 is controlled in any appropriate manner so that when a signal is introduced to it from the OR gate 180, it causes the cassette tape 114 and paper tape 116 to move forward through four increments, and then to stop and wait for the next signal from the OR gate.

Should the user wish to make a flat "case charge" to a client, he depresses a "case charge" button 92 (FIGS. 4 and 5) which, as shown in FIG. 5, is connected to the OR gate 180, so as to initiate a similar set of operations as were initiated by the "start" button or by the "phone charge" button 90. When the "phone charge" button 90 is depressed, the register 172 is set to a particular state to represent a "phone charge" identifying number. Likewise, when the "case charge" push button 92 is depressed, the register 172 is set to a different configuration to identify that the work activity is a "-case charge."

The complements of the "phone charge" signal and of the "case charge" signal are applied to an OR gate 182, so that when either the "phone charge" push button 90 or the "case charge" push button 92 is depressed, the AND gate 170 is disabled, insofar as the dial 122 is concerned. When the "stop" button is depressed, the AND gate 164 is enabled, and the registers 150 and 172 are reset. The drive 182 produces a signal INC2 when it has completed its first increment of motion, and this signal is used to enable the AND gate 152. Likewise, the drive 182 produces a signal INC3 when it has completed its second increment of movement, and this latter signal is used to enable the AND gate 174. Finally, the drive 182 develops a signal INC4 when it has completed its third increment of movement, and this latter signal is used to enable the AND gate 164.

In the operation of the system, and as described briefly above, the user first turns on the "off-on" button 126 to activate the unit. Then he enters the number corresponding to the client's account on the keyboard 118, and that number is stored in the register 150. He then turns the dial 122 to the number identifying the work to be performed, and that latter number is stored in the register 172, assuming that both the "phone charge" push button 90 and the "case charge" push button 92 are not depressed. He then depresses the "-start" button on the keyboard 118, and that button causes the clock 160 to start, and the counter 162 begins to count.

The drive 182 moves the paper tape 116*a* and the magnetic tape in the cassette 114 through one space to clear them from the previous recording. The INC2 signal is then developed which enables the AND gate 152 so that the number in the register 150 which identifies the client's account may be recorded on both the paper tape 116a and on the magnetic tape in the cassette mechanism 114. The drive 182 then moves through the second increment, and the signal INC3 is developed. This latter signal enables the AND gate 174, so that the work identification number from the register 172 may be recorded and printed in the mechanisms 114 and 116 respectively. Then, the drive moves through the third increment, and the signal INC4 is developed which enables the gate 164. At the end of the work activity, the user presses the "stop" button, which turns off the clock 60, and which enables the AND gate 164 so that the time count in the counter 162 may be recorded and printed in the mechanisms 114 and 116 respectively. When the "stop" button is depressed, the registers 150 and 172 are reset. When the "start" button is depressed for a subsequent activity, the counter 162 is reset.

If during the progress of any work activity, the user takes or makes a phone call, the switching circuit 78 causes the clock 60 to stop. The user then sets up the calling or called client's account number on the keyboard 118. He then presses the "phone charge" button 90. This causes the register 172 to be set to a particular identifying configuration for "phone charge." Then, the user presses the "start" button, and as the drive 182 moves through its various cycles, the client's identifying number is recorded and printed, as well as the work designation "phone charge." A similar set of operations occur when the "case charge" button 92 is depressed. At that time, the register 172 is set to a "case charge" identification, so that the drive 182 moves through its cycles, the client's identifying number, and the work activity "case charge" is recorded. It is clear that predetermined charges may be allocated to "phone charge" and to "case charge."

As mentioned above, periodically the cassette is removed from the mechanism 114 and sent to a central processing office. The central processing office correlates the information on the cassette directly into client statements, or into other reports as required by the user.

The invention provides, therefore, an improved unit for permitting a user to keep track of his time and clients on a simple and convenient basis, and without the need for arduous and time consuming paper work. It is evident that although particular embodiments of the unit have been shown and described, modifications may be made without departing from the spirit of the invention. The following claims are intended to cover all such modifications.

What is claimed is:

1. An automatic timekeeping and accounting unit including manually operated means for establishing indicia representing an account and for establishing indicia representing a work activity; clock means for establishing the time interval in which a particular work activity occurred; recording means coupled to said manually operated means and to said clock means for recording the aforesaid indicia; and a telephone switching circuit connected to said clock means and operated by a telephone to stop the clock means when the telephone is operated.

2. The automatic timekeeping and accounting unit defined in claim 1, in which said recording means includes a paper tape printing recording system.

3. The automatic timekeeping and accounting unit defined in claim 1, in which said recording means includes a magnetic recording system including a removable cassette.

4. The automatic timekeeping and accounting unit defined in claim 1, and which includes a first manually operated switch means for activating said clock means and a second manually operated switch means for stopping said clock means.

5. The automatic timekeeping and accounting unit defined in claim 1, and which includes circuit means for maintaining information concerning an interrupted activity in memory in said unit upon the activation of said telephone switching circuit.

6. The automatic timekeeping and accounting unit defined in claim 1, and which includes further control circuitry responsive to the activation of said telephone switching circuit for enabling the time interval of a telephone conversation to be recorded by said recording means.

7. The automatic timekeeping and accounting unit defined in claim 1, in which said recording means includes a magnetic recording system having a removable cassette, and a paper tape recording system.

8. The automatic timekeeping and accounting unit defined in claim 5, and which includes control means for automatically returning the system to the interrupted activity when the telephone is de-activated.

* * * * *